(12) United States Patent
Tsuru et al.

(10) Patent No.: US 8,653,400 B2
(45) Date of Patent: Feb. 18, 2014

(54) HIGH STRENGTH WELDED STEEL TUBE SUPERIOR IN HYDROGEN EMBRITTLEMENT CRACKING RESISTANCE OF WELD METAL AND METHOD OF PRODUCTION OF SAME

(75) Inventors: Eiji Tsuru, Futtsu (JP); Takuya Hara, Futtsu (JP); Hitoshi Asahi, Futtsu (JP); Hiroshi Morimoto, Futtsu (JP); Yoshio Terada, Kimitsu (JP); Tatsuya Yoshida, Kimitsu (JP); Kouichi Shinada, Futtsu (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 1628 days.

(21) Appl. No.: 11/884,860

(22) PCT Filed: Feb. 22, 2006

(86) PCT No.: PCT/JP2006/303820
§ 371 (c)(1),
(2), (4) Date: Aug. 21, 2007

(87) PCT Pub. No.: WO2006/090889
PCT Pub. Date: Aug. 31, 2006

(65) Prior Publication Data
US 2008/0257008 A1    Oct. 23, 2008

(30) Foreign Application Priority Data

Feb. 25, 2005  (JP) ................................. 2005-050911
Feb. 2, 2006   (JP) ................................. 2006-025897

(51) Int. Cl.
*B23K 31/02*  (2006.01)
*B23K 33/00*  (2006.01)
*B21C 37/08*  (2006.01)

(52) U.S. Cl.
CPC ............. *B23K 31/027* (2013.01); *B23K 33/006* (2013.01); *B21C 37/08* (2013.01)
USPC ............... 219/61; 219/60 R; 219/101; 72/368

(58) Field of Classification Search
USPC ........... 219/74, 75, 125.11, 125.12, 61, 60 A, 219/60 R, 146.22, 146.23, 137 WM, 137 F; 148/128, 134, 127; 427/38.5
See application file for complete search history.

(56) References Cited

U.S. PATENT DOCUMENTS 4,475,963 A * 10/1984 Takahashi et al. ............ 148/503
5,091,628 A    2/1992 Chai et al.
(Continued)

FOREIGN PATENT DOCUMENTS

CN    1 262 157    8/2000
JP    56-166321    12/1981
(Continued)

OTHER PUBLICATIONS

Supplementary European Search Report dated Mar. 12, 2009 issued in corresponding European Application No. EP 06 71 4941.
(Continued)

*Primary Examiner* — Tu B Hoang
*Assistant Examiner* — Thien S Tran
(74) *Attorney, Agent, or Firm* — Kenyon & Kenyon LLP

(57) ABSTRACT

The present invention provides a high strength welded steel pipe superior in weld zone embrittlement crack characteristics and a method of production of the same, that is, a method of production of a welded steel pipe superior in hydrogen embrittlement cracking resistance of weld metal characterized by seam welding from the inner and outer surfaces by a tensile strength of 850 MPa or more, then expanding or reducing the size of the pipe for correction, which method of production of welded steel pipe characterized in that the hydrogen concentration of the preceding weld metal is 0.2 cc or less per 100 g at ordinary temperature.

6 Claims, 4 Drawing Sheets

(56) References Cited

U.S. PATENT DOCUMENTS

2004/0256370 A1* 12/2004 Keegan ................ 219/145.22
2005/0016980 A1* 1/2005 Hara et al. ............ 219/137 WM

FOREIGN PATENT DOCUMENTS

| JP | 57-035636 | 2/1982 | | |
| JP | 57-0355636 | 2/1982 | | |
| JP | 62-124219 | 6/1987 | | |
| JP | 11-61328 A | 3/1999 | | |
| JP | 2001-001148 | 1/2001 | | |
| JP | 2003-311321 | * 11/2003 | ............. | B21C 37/08 |
| JP | 2003-311321 A | * 11/2003 | ............. | B21C 37/08 |

OTHER PUBLICATIONS

Macia et al., "Evaluation of Hydrogen Cracking Susceptibility in X120 Girth Welds", Proceeding of IPC, Oct. 4-8, 2004, IPC04-0585, p. 1465-1474.

* cited by examiner

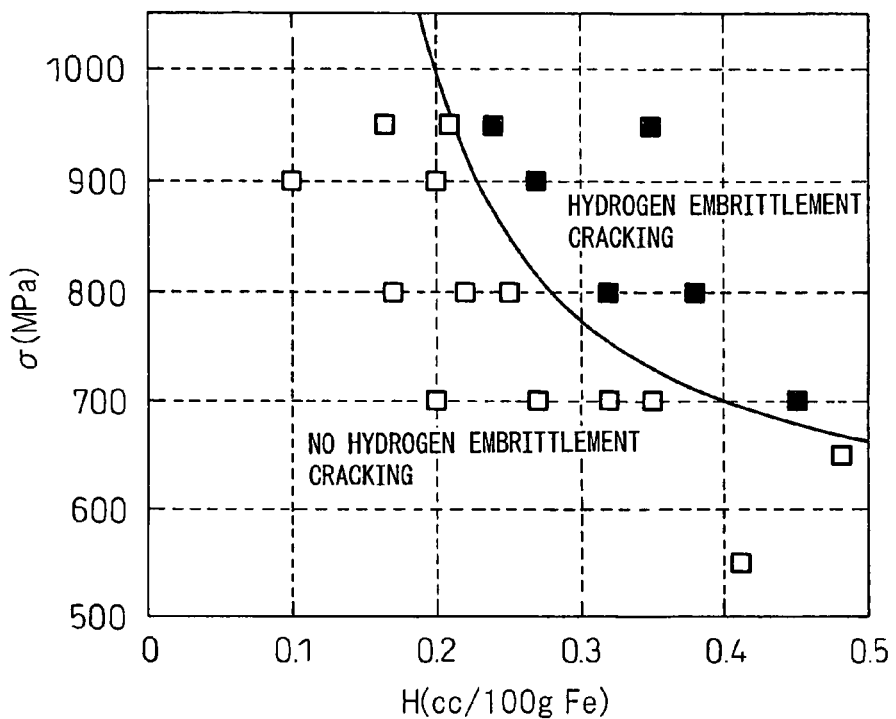
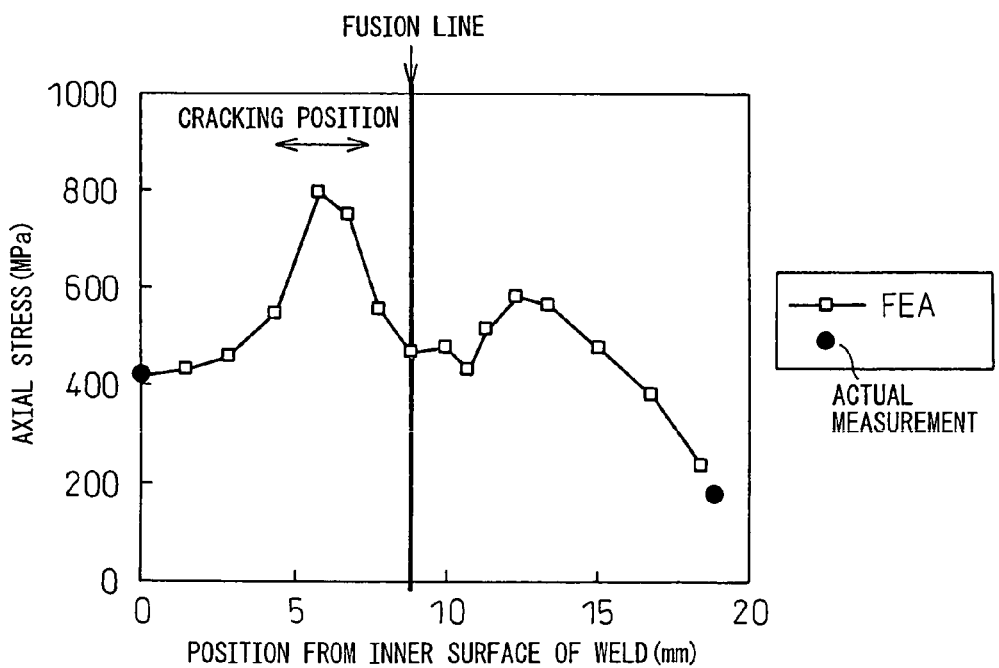

HIGH STRENGTH WELDED STEEL TUBE SUPERIOR IN HYDROGEN EMBRITTLEMENT CRACKING RESISTANCE OF WELD METAL AND METHOD OF PRODUCTION OF SAME

TECHNICAL FIELD

The present invention relates to a high strength welded steel pipe, used for a natural gas or crude oil transport line pipe or the like, having a tensile strength in the circumferential direction of the weld metal formed by the base material and arc welding of 850 MPa or more and a method of production of the same.

BACKGROUND ART

Recently, the laying of high strength large diameter line pipe having a tensile strength of 850 MPa or more has started to be studied from the viewpoints of streamlining transport in long distance pipelines transporting natural gas and of reduction of the cost of ancillary facilities. Such line pipe is usually produced by shaping steel sheet into a tube and seam welding the abutted part such as with the UOE process, UOC process, JOE process, or bending roll process. In this case, the seam weld zone forming the joint is usually formed by submerged arc welding in the order of inner surface welding and outer surface welding. However, non-destructive inspection after outer surface welding sometimes reveals cracks in a direction perpendicular to the steel pipe axial direction at the seam weld zone, that is, so-called transverse cracks.

If using such a steel pipe where this kind of transverse crack remains in a frozen terrain, there are the danger of seasonal fluctuations in temperature causing a tensile stress exceeding the yield strength of the pipe body in the axial direction being applied and the pipe breaking and the danger of repeated application of stress causing cracks to grow, the transported fluid to leak, and a major accident occurring. Because of this, it is necessary to prevent the formation of cracks at the time of production in advance or to reliably detect cracks formed by non-destructive inspection and eliminate them.

A transverse crack in the seam weld zone is a type of embrittlement crack of a high strength material. This embrittlement crack is generally due to hydrogen. This is also referred to as a "hydrogen embrittlement crack". If the strength decreases, this becomes harder to form. However, if reducing the strength of the seam weld zone, while embrittlement cracks become harder to occur, deformation from the seam weld zone is selectively promoted at the time of application of internal pressure leading to breakage from the weld zone in some cases. Consequently, a method of preventing hydrogen embrittlement cracks while maintaining the strength of the weld metal at the base material strength or more has become necessary.

Hydrogen embrittlement cracks depend on the hydrogen concentration, load stress, and material characteristics, in particular the strength, so it is necessary to control these to their limit values or less so that hydrogen embrittlement cracks do not occur due to the composite effect. As the method for lowering the hydrogen concentration, the method of heating to 100° C. or more, preferably 200° C. or more, after welding and holding this for exactly a suitable time, so-called "post heating", is the method of heating the weld metal after seam welding to cause diffusion of the hydrogen to a hydrogen concentration of less than the limit where transverse cracks occur.

From this viewpoint, the technology of compositely suppressing the strength of the weld metal of a UOE steel pipe, the strength of the base material, and the welding conditions to prevent hydrogen embrittlement cracks in the seam weld zone of a high strength material is disclosed in Japanese Patent Publication (A) No. 2003-311321. Japanese Patent Publication (A) No. 2003-311321 describe that transverse cracks in the weld zone frequently occur at the preceding seam weld zone, but does not disclose specific conditions for preventing transverse cracks by suppression of the hydrogen concentration and weld residual stress.

Further, a method of welding, then quenching and tempering the steel pipe as a whole so as to prevent a drop in the toughness and solidification cracking is proposed in Japanese Patent Publication (A) No. 57-35636, but the hydrogen concentration and weld residual stress were not touched upon. In addition, as a method for relieving the residual stress, which is a cause inducing hydrogen embrittlement cracks, there are also so-called stress-relief annealing of heating the material to about 700° C. after welding or the method of striking by hammer peening to give plastic deformation to the weld zone and thereby lower the residual stress, but the effect of the relationship between the hydrogen concentration and residual stress on transverse cracks is not clear and the hydrogen embrittlement cracking resistance is not sufficiently improved. Further, these methods have to be performed immediately after welding. If considering the production process and production costs, they are not necessarily suitable methods for application to the seam weld zone.

Regarding the relationship between the amount of diffusible hydrogen diffused in the steel at ordinary temperature and released at the time of heating up to 400° C. and the hydrogen embrittlement cracking, the fact that hydrogen embrittlement cracks do not occur even in a high strength material of over 827 MPa with an amount of diffusible hydrogen of not more than 5 cc per 100 g is reported in Proceedings of IPC 2004, Oct. 4 to 8, 2004, IPC04-0585 Evaluation of Hydrogen Cracking Susceptibility in X120 Girth Welds. However, this discovery is described in regard to gas welding for welding together steel pipes by multiple passes. At weld zones in seam welding covered by the present invention, it is confirmed that hydrogen embrittlement cracks still occur even with 5 cc or less per 100 g.

Further, as points for improvement of the weld material, there is the method of causing the formation of VN or other hydrogen trap sites in the weld metal to reduce the diffusible hydrogen harmful for cracks or the method of reducing the residual stress at ordinary temperature by a low temperature transformation welding material. However, use of hydrogen trap sites is not necessarily a useful method in a high strength material. Further, the use of a low temperature transformation welding material invites a remarkable rise in costs.

DISCLOSURE OF THE INVENTION

The present invention has as its object the prevention of transverse cracks due to hydrogen occurring in the weld zones of high strength welded steel pipe seam welded from the inner and outer surfaces. As a technology for preventing hydrogen embrittlement cracks of weld zones, there are the reduction of the diffusion of hydrogen or residual stress by heat treatment, the reduction of the residual stress by imparting plastic deformation, the control of residual stress by imparting hydrogen trap sites and design of ingredients of the weld metal, etc., but heating to the relatively high temperature, for example, 600° C., where residual stress is reduced requires excessive time for heating and cooling. Further, special processing equipment becomes necessary for reducing the residual stress by plastic deformation. Improvement of the metal material invites a remarkable rise in costs due to the addition of the alloy ingredients.

The present invention provides the technology of defining the hydrogen concentration of the weld metal of a high strength welded steel pipe with a tensile strength of 850° C. or more, in particular the weld metal formed by the preceding seam welding and preventing hydrogen induced cracks, that is, cracks in the weld zone in a direction perpendicular to the steel pipe axis, that is, hydrogen embrittlement cracks.

The present invention was made so as to solve the aforementioned problems and has as its gist the following:

(1) A high strength welded steel pipe superior in hydrogen embrittlement cracking resistance of weld metal produced by shaping steel sheet of a tensile strength of 850 MPa or more into a tubular form, seam welding the abutting part from the inner and outer surfaces, then expanding or reducing the size of the pipe for correction, said welded pipe characterized in that the hydrogen concentration of the weld metal formed by the preceding welding in the seam welding from the inner and outer surfaces of said steel pipe is 0.2 cc or less per 100 g at ordinary temperature.

(2) A method of production of a high strength welded steel pipe superior in hydrogen embrittlement cracking resistance of weld metal characterized by shaping steel sheet of a tensile strength of 850 MPa into a tubular form, seam welding the abutting part from the inner and outer surfaces, making the hydrogen concentration of the weld metal formed by the preceding seam weld in the seam welding from said inner and outer surfaces 0.2 cc or less per 100 g at ordinary temperature, then expanding or reducing the size of the pipe for correction.

(3) A method of production of a high strength welded steel pipe superior in hydrogen embrittlement cracking resistance of weld metal as set forth in (2) by using a dehydrogenation treatment to reduce the hydrogen concentration of the weld metal formed by seam welding from the inner and outer surfaces to 0.2 cc or less per 100 g at ordinary temperature.

(4) A method of production of a high strength welded steel pipe superior in hydrogen embrittlement cracking resistance of weld metal as set forth in (2) characterized by using a dehydrogenation treatment to reduce the hydrogen concentration of the weld metal formed by preceding welding in the seam welding from the inner and outer surfaces to 0.2 cc or less per 100 g at ordinary temperature.

(5) A method of production of a high strength welded steel pipe superior in hydrogen embrittlement cracking resistance of weld metal as set forth in (3) or (4) characterized in that the heating temperature T [° C.] of the dehydrogenation treatment is in the range of 150 to 500° C., and the heating time is t[s] or more found from the following formula (I) from the weld metal height h [mm] and heating temperature T.

$$t=(h/16)^2/\exp^{(-957/(273+T))} \quad (1)$$

BRIEF DESCRIPTION OF THE DRAWINGS

FIG. 1 shows the effects of the hydrogen content and stress on hydrogen cracking.

FIG. 2 is a graph showing the relationship of the axial direction residual stress distribution at the center of a seam weld of a UOE steel pipe of a steel pipe size of φ914×16 mm and a tensile strength of 850 MPa with the position from the inner surface.

BEST MODE FOR CARRYING OUT THE INVENTION

Figure 3:
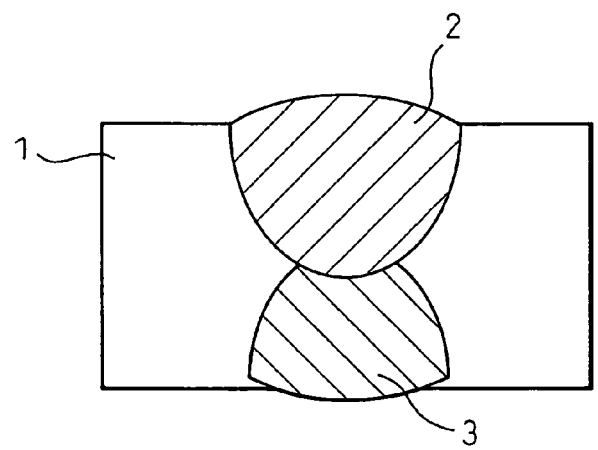
FIG. 3 is a figure showing the position for finding the axial direction residual stress distribution.

When producing a high strength welded steel pipe having a tensile strength of 850 MPa or more by the UOE pipe-making process, the ends of the steel sheet are bent by a C-press, the sheet is bent to a U-shape by a U-press, then the sheet is formed into a tube by an O-press, then usually the ends are temporarily attached from the outer surface, inner surface welding is performed by submerged welding, then outer surface welding is performed and the pipe is enlarged or reduced in size for correction to make it circular in cross-section.

When detecting defects in the seam weld zone of this UOE steel pipe by ultrasonic flaw detection in accordance with JIS G 0584, while the frequency was small, transverse cracks were discovered. If identifying the positions where defects are detected by the results of ultrasonic flaw detection, it was learned that transverse cracks occurred in the weld metal at the previously welded inner surface. Further, the inventors investigated the fracture surface of the transverse cracks by a scan type electron microscope and as a result learned that fracture surfaces distinctive to hydrogen embrittlement cracks were exhibited.

From this, the inventors concluded that transverse cracks formed at the seam weld zones of high strength welded steel pipe were hydrogen embrittlement cracks due to the hydrogen taken into the weld metal from the flux, condensation at the grooves, moisture in the atmosphere, and the like and the residual welding stress. However, when they tried detecting defects by ultrasonic flaw detection after performing inner surface welding, then not performing outer surface welding, they learned that transverse cracks did not occur with inner surface welding as is.

The thick-gauge steel sheet (base material) forming the material of the UOE steel pipe explained here is obtained by hot controlled rolling of steel having a steel composition containing, by mass %, C: 0.02 to 0.10%, Si: 0.01 to 0.6%, Mn: 1.5 to 2.5%, P: 0.015% or less, S: 0.003% or less, Ni: 0.1 to 2.0%, Mo: 0.15 to 0.60%, Nb: 0.001 to 0.10%, Ti: 0.005 to 0.030%, and Al: 0.06% or less and further, according to the need, containing one or more of B: 0.0001 to 0.005%, N: 0.0001 to 0.006%, V: 0.001 to 0.10%, Cu: 0.01 to 1.0%, Cr: 0.01 to 1.0%, Zr: 0.0001 to 0.005%, Ta: 0.0001 to 0.005%, Ca: 0.0001 to 0.01%, REM: 0.0001 to 0.01%, and Mg: 0.0001 to 0.006%, and having a balance of Fe and unavoidable impurities.

At the time of the production of said UOE steel pipe, thick-gauge steel sheet having the previously described steel composition (base material) is welded by a heat input of 1.5 kJ/mm to 6.3 kJ/mm using welding wire comprised of, by mass %, C: 0.01 to 0.12%, Si: 0.3% or less, Mn: 1.2 to 2.4%, Ni: 4.0 to 8.5%, Cr+Mo+V: 3.0 to 5.0%, Ti: 0.005 to 0.15%, and Al: 0.02% or less.

The thus obtained weld metal contains, by mass %, C: 0.04 to 0.14%, Si: 0.05 to 0.4%, Mn: 1.2 to 2.2%, P: 0.01% or less, S: 0.010% or less, Ni: 1.3 to 3.2%, Cr+Mo+V: 1.0 to 2.5%, Ti: 0.003 to 0.050%, Al: 0.02% or less, B: 0.005% or less, and O: 0.01 to 0.03% and has a balance of Fe and unavoidable impurities.

The inventors investigated the relationship of the stress generating hydrogen embrittlement cracks in the weld metal of a high strength welded steel pipe having a tensile strength of 850 MPa or more and the hydrogen content in the following way. A sample having a size in the circumferential direction and axial direction of 200 mm×200 mm was taken so as to include the inner and outer surface weld metal from the welded steel pipe and was immediately cooled and stored on dry ice. From the weld material of this sample, rod-shaped tensile test pieces having a longitudinal direction parallel to the welding direction and having a diameter of the parallel part of 6 mm were taken. The rod-shaped tensile test piece was plated by cadmium so as to prevent the escape of the hydrogen. Next, the tensile test piece was given a constant load for 240 hours and the presence of fractures, that is, the presence of hydrogen embrittlement cracks, was investigated. Further, a rod-shaped tensile test piece having a parallel part of a diameter of 6 mm obtained in the same way was used to measure the hydrogen content in accordance with the gas chromatography method employed in the hydrogen measurement method of the steel weld zones of JIS Z 3118.

The results are shown in FIG. 1. The hydrogen content was the amount of diffusible hydrogen measured by the above-mentioned measurement method, that is, held at 45° C. for 72 hours and trapped, expressed by the volume [cc] of hydrogen contained per 100 g of the test piece. The ordinate of FIG. 1 expresses the stress σ [MPa] obtained by dividing the constant load applied to the test piece by the cross-sectional area of the parallel part of the test piece.

As shown in FIG. 1, when the applied stress is high, hydrogen embrittlement cracks are formed by a small amount of hydrogen. If the stress is low, even if the hydrogen content is great, hydrogen embrittlement cracks are not formed. Further, from FIG. 1, when the hydrogen content H [cc] and the tensile stress σ [MPa] satisfy $$(H-0.1) \times (\sigma-550) \leq 45$$

it can be deduced that hydrogen embrittlement cracks will not form. Therefore, if the hydrogen content H [cc] contained in the weld material formed by the preceding seam welding and the tensile residual stress [MPa] applied to the weld metal satisfy the relationship of said formula, it is possible to prevent hydrogen embrittlement cracks of a high strength welded steel pipe.

Consequently, the inventors found the residual stress of the weld metal zone before pipe enlargement in the UOE process by numerical analysis simulation by the finite element method (below also referred to as "FEA"). This is because it is difficult to nondestructively test the residual stress of the weld metal seam welded from the inner and outer surfaces.

FIG. 2 shows the results when performing seam welding in the order of the inner surface and outer surface to form the weld metal, assuming the state before pipe enlargement, and finding the distribution in the thickness direction of the residual stress in the axial direction at the center of the weld metal at the cross-section of the steel pipe in the circumferential direction (weld center line) by FEA. Note that the abscissa of FIG. 2, as schematically shown in FIG. 3, is the distance from the inner surface of the steel pipe to the outer surface.

As shown in FIG. 2, the residual stress shows the maximum value at the preceding welded inner surface weld metal side. That value reaches the yield strength of the weld metal. Further, the position where the residual stress becomes maximum matches with the location of formation of a transverse. Here, as shown in FIG. 1, the presence of formation of hydrogen embrittlement cracks of a steel pipe having a high strength weld metal is determined by the strength of the weld metal, the hydrogen concentration, the residual stress, and the time that the residual stress is applied in the presence of hydrogen, so the inventors produced a high strength welded steel pipe having a tensile strength of 850 MPa or more and took note of the relationship between the hydrogen concentration of the inner surface weld metal after the elapse of a certain time at ordinary temperature and the formation of transverse cracks.

Transverse cracks were detected by the ultrasonic flaw detection method in accordance with JIS G 0584 after ending the inner surface welding and the outer surface welding, then standing for 72 hours without pipe enlargement. The position of a detected transverse crack was used to identify whether the location of occurrence was the inner surface weld metal or the outer surface weld metal.

Further, transverse cracks occur during pipe enlargement or pipe reduction after seam welding, so the hydrogen concentrations of the inner surface and outer surface of the weld metal were measured when first seam welding from the inner surface, then seam welding from the outer surface, then not enlarging or reducing the size for correction, but waiting for the elapse of 4 hours at the point in time when the weld metal becomes near ordinary temperature. To measure the hydrogen concentration, a sample having a size in the circumferential direction and axial direction of 200 mm×200 mm was taken so as to include the inner and outer surface weld metal from the welded steel pipe and was immediately cooled by dry ice and stored. Test pieces of 5 mm×5 mm×40 mm were obtained from the inner surface weld metal and outer surface weld metal of this sample. To suppress the release of diffusible hydrogen, the hydrogen concentration was measured immediately after obtaining the test pieces. The hydrogen concentration was measured after holding the test pieces at 45° C. for 72 hours to extract the diffusible hydrogen, then measuring it by the gas chromatography method employed as the method of measurement of hydrogen of a steel weld zone defined in JIS Z 3118. The hydrogen concentration was calculated as the concentration per 100 g by dividing the diffusible hydrogen content by the mass of the test pieces.

Figure 4:
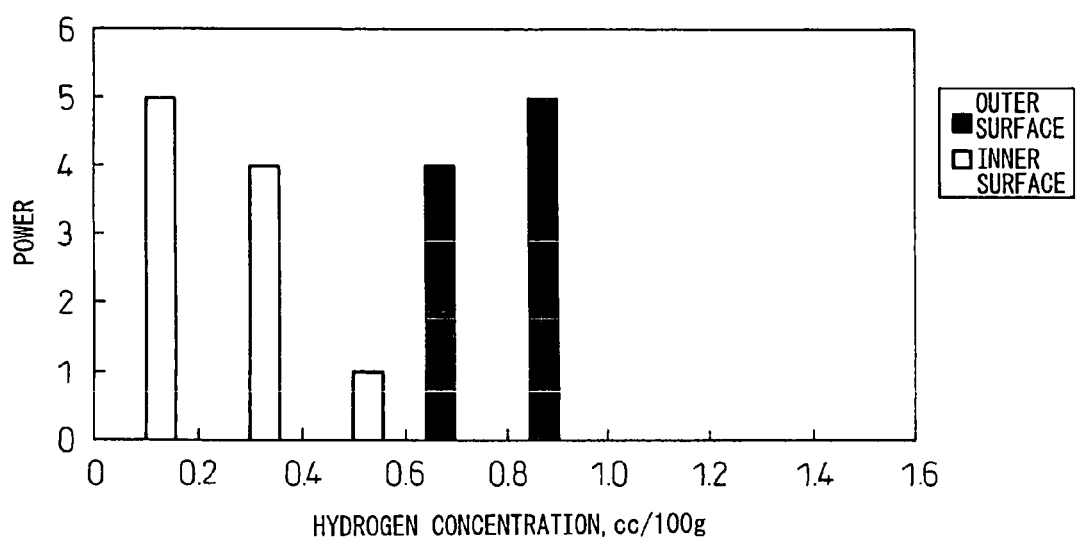
FIG. 4 is a graph showing the hydrogen concentration power distribution of the inner and outer surface weld metal.

FIG. 4 shows the hydrogen concentrations of the inner surface weld metal and outer surface weld metal by a power distribution. FIG. 4 shows the distribution when classifying the average value of the hydrogen concentrations measured by taking three samples from one steel pipe into less than 0.2, 0.2 to less than 0.4, 0.4 to less than 0.6, 0.6 to less than 0.8, and 0.8 to less than 1.0 and defining the hydrogen concentration of the steel pipe as "1" power. From FIG. 3, it is learned that the hydrogen concentration of the inner surface weld metal spreads from 0.0 to 0.6 cc per 100 g and that the hydrogen concentration of the outer surface weld metal spreads from 0.6 to 1.0 cc per 100 g. The reason why the hydrogen concentration of the inner surface metal is lower than the outer surface is that the inner surface weld metal is also heated at the time of outer surface welding and the hydrogen is diffused.

Figure 5:
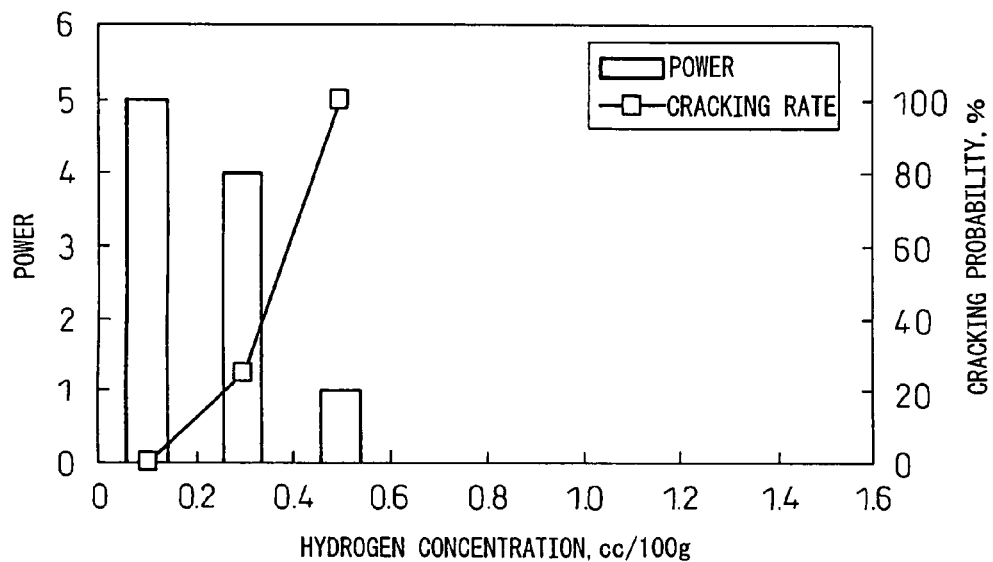
FIG. 5 is a graph showing the hydrogen concentration power distribution of the inner and outer surface weld metal and the cracking rate.

FIG. 5 shows the relationship of the hydrogen concentration power distribution of the inner surface weld metal and the cracking probability. It was learned that transverse cracks begin to be formed when the hydrogen concentration exceeds 0.2 cc per 100 g. Here, the "cracking probability" is the probability of a transverse crack being detected at the inner surface weld metal of a steel pipe having an average value of hydrogen concentration of an equal level. For example, when the average value of the hydrogen concentration was 0.2 to less than 0.4 cc, the power is 4, the cracking probability is 20%, and a transverse crack is in one out of four steel pipes. Note that transverse cracks formed at the inner surface weld metal were detected by the ultrasonic flaw detection method in accordance with JIS G 0584.

Figure 6:
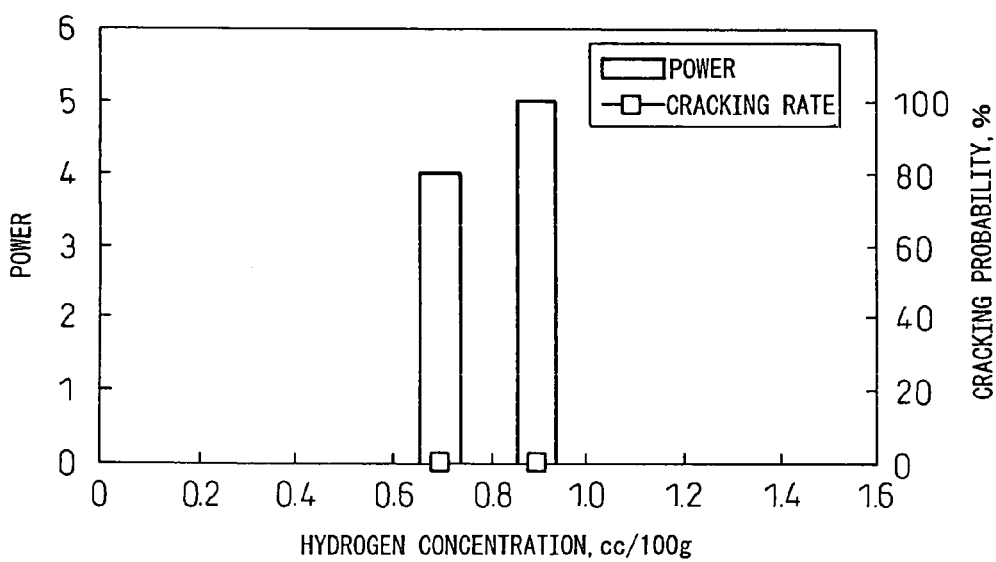
FIG. 6 is a graph showing the hydrogen concentration power distribution and the cracking rate of the outer surface weld metal.

FIG. 6 shows the relationship of the hydrogen concentration power distribution of the outer surface weld metal and the cracking probability. Despite the hydrogen concentration at the outer surface weld zone being higher than the hydrogen concentration of the inner surface, cracks were not formed. The reason was that the peak of residual stress shown in FIG. 2 started at the inner surface side. This suggests the necessity of suppressing the hydrogen concentration of the inner surface metal to a lower level. Here, the cracking probability is the probability of a transverse crack being detected in the outer surface weld metal of a steel pipe having an average value of hydrogen concentration of an equal level. Transverse cracks were detected by the ultrasonic flaw detection method in accordance with JIS G 0584.

Next, the inventors investigated the transverse cracks and hydrogen concentration of weld metal obtained by seam welding from the inner surface, then seam welding from the outer surface, then heating at 150 to 250° C. until pipe enlargement or pipe reduction to reduce the hydrogen concentration. The transverse cracks were calculated by the ultrasonic flaw detection method, while the hydrogen concentration was calculated by holding the sample at 45° C. for 72 hours to extract the diffusible hydrogen, measuring the hydrogen content in accordance with the gas chromatography method employed in the method of measurement of hydrogen of steel weld zones defined in JIS Z 3118, and expressing it as the volume of hydrogen per 100 g mass of the sample at ordinary temperature. In this case, the hydrogen concentration of the inner surface weld metal was 0.2 cc or less per 100 g.

For comparison, the inventors similarly investigated the transverse cracks and hydrogen concentration of weld metal obtained by coating an oil over the groove surfaces before seam welding from the preceding inner surface, seam welding from the inner and outer surfaces, and raising the hydrogen concentration of the inner surface weld metal. The result was a hydrogen concentration of the inner surface weld metal of 0.3 cc or more per 100 g.

Figure 7:
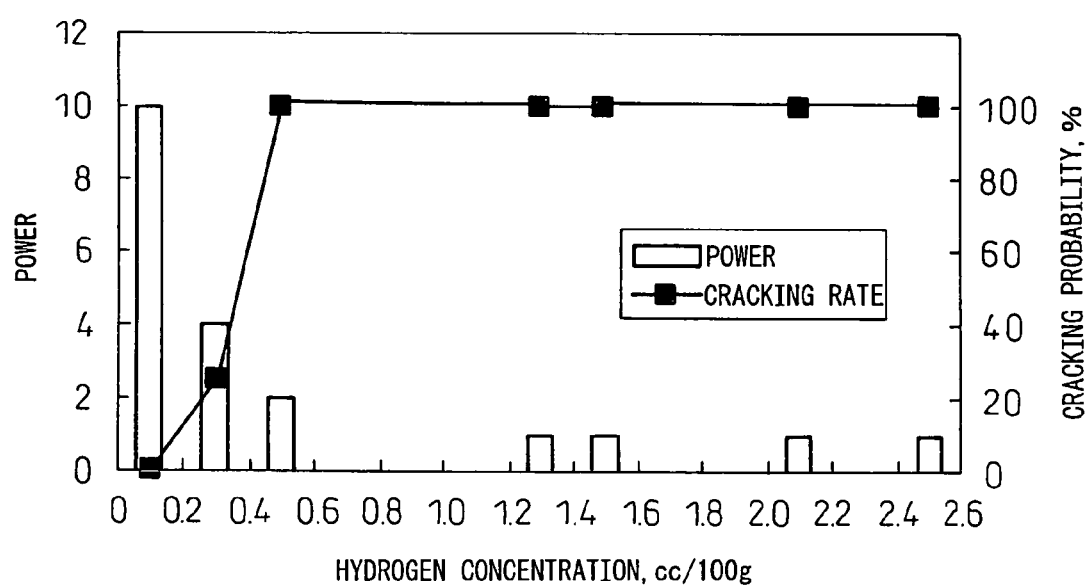
FIG. 7 is a graph showing the hydrogen concentration power distribution of the inner surface weld metal including a heat treated material and oil dropped material and the cracking rate.

FIG. 7 shows the relationship of the hydrogen concentration power distribution of the inner surface weld metal and crack probability. When the hydrogen concentration was 0.2 cc or less per 100 g, there were almost no cracks formed from the weld metal. On the other hand, when the hydrogen concentration was over 0.4 cc per 100 g, transverse cracks were confirmed in all of the samples.

From the above, it was learned that by suppressing the hydrogen concentration of the inner surface weld metal to 0.2 cc or less per 100 g, formation of transverse cracks can be stably prevented. In high strength welded steel pipe having a tensile strength of 850 MPa or more, if trying to improve the hydrogen embrittlement cracking resistance by the metal structure, there is a good chance of the weld metal falling in strength and reduction of the hydrogen concentration is extremely effective.

The necessity of defining the hydrogen concentration at ordinary temperature in the method of production of the high strength welded steel pipe of the present invention is explained below.

Hydrogen-induced cracks occur near ordinary temperature in weld metal formed by the preceding seam welding. The transformation point of the weld metal of a high strength welded steel pipe with a strength of 850 MPa or more is 300 to 400° C. In this case, when the temperature of the weld metal is over 100° C., the residual stress of the inner surface weld metal is 500 MPa or less. If the temperature falls to 100° C. or less, the residual stress of the inner surface weld metal rises and exceeds 800 MPa as clear from numerical analysis.

On the other hand, the outer surface weld metal has a residual stress at ordinary temperature of 600 MPa, so despite the hydrogen concentration being 0.66 to 0.88 cc per 100 g, there are almost no cracks formed. The hydrogen concentration in the inner surface weld metal is lower than the outer surface weld metal and the residual stress of the inner surface weld metal at 100° C. or more is lower than the residual stress of the outer surface weld metal at ordinary temperature, so hydrogen embrittlement cracks will not form in the inner surface weld metal at 100° C. or more. However, at a temperature of the inner surface weld metal of 100° C. or less, the diffusion of hydrogen becomes remarkably slow and the drop in hydrogen concentration is suppressed. Furthermore, if the residual stress of the inner surface weld metal rises until it exceeds the tensile strength, it leads to the formation of transverse cracks. Therefore, defining the hydrogen concentration at ordinary temperature has important meaning for preventing hydrogen embrittlement cracks.

Next, the necessity for making the hydrogen concentration in the inner surface weld metal 0.2 cc or less per 100 g at least in the period after outer surface welding to correction by pipe enlargement or pipe reduction will be explained.

In the correction of pipe enlargement or pipe reduction, in order to obtain a better circularity, usually 1% pipe enlargement or pipe reduction is performed. Due to this, the residual stress of the weld metal is largely relieved. The maximum value of the residual stress in the inner surface metal decreases sharply to 500 MPa or less. If the residual stress falls to this extent, hydrogen embrittlement cracks do not occur at a concentration of hydrogen introduced by seam welding under ordinary conditions. Further, the fact that hydrogen embrittlement cracks form near ordinary temperature in the period of time from the succeeding seam welding to the corrective process became clear as a result of investigation. When performing the inner surface welding first and making corrections by pipe enlargement, the inventors concluded that the hydrogen concentration in the inner surface weld metal must be made 0.2 cc per 100 g at ordinary temperature at least in the period after outer surface welding to pipe enlargement.

The inventors studied the possibility of formation of cracks in the period of time from the preceding inner surface welding until the following outer surface welding in the process of production of welded steel pipe. The hydrogen concentration in the inner surface weld metal before the outer surface welding is similar to the hydrogen concentration of the outer surface shown in FIG. 4 and is in the range of 0.6 to 1.0 cc per 100 g. That is, the hydrogen concentration in the inner surface weld metal before seam welding from the outer surface is at a far higher level than the hydrogen concentration after the outer surface welding. However, the residual stress occurring by only inner surface welding is at the maximum 500 MPa. Despite the hydrogen concentration being high, it is learned that this does not lead to formation of cracks. Therefore, to prevent hydrogen embrittlement cracks, it is a necessary to make the hydrogen concentration of the inner surface weld metal at ordinary temperature after seam welding from the outer surface until pipe enlargement 0.2 cc or less per 100 g.

The mechanism of hydrogen embrittlement cracking by the residual stress of a high strength welded steel pipe is, in the production of UOE steel pipe, believed to be the case of seam welding by submerged arc welding, welding from the inner surface first, then welding from the outer surface second. Note that the present invention also includes the case of the outer surface welding first and the inner surface welding following it. Further, the UOE process was shown as an example of the method of shaping the steel pipe, but welded steel pipe with a tensile strength of 850 MPa or more is included in the present invention even with the method of shaping by the bending roll or JOC process.

When producing a high strength welded steel pipe without preheating or post heating the seam weld zone, cracks occur at a 20% probability as shown in FIG. 5 under a usual environment with the grooves not oiled. In this case, the cause of introduction of hydrogen in the weld metal is considered to be condensation at the groove surfaces, the moisture in the flux, etc. In the usual production process, 1, it is an unavoidable level.

As a method for suppressing the hydrogen concentration of weld metal of a high strength welded steel pipe to 0.2 cc or less per 100 g, for example there is the method of post heat treatment after outer surface welding. For prevention of hydrogen embrittlement cracks by post heat treatment, it is preferable to make the heating temperature 200° C. to 400° C. and make the holding time at the heating temperature 1 minute to 20 minutes. The higher the temperature of the heating, the shorter the time until the effect can be obtained. As another specific method, preheating in the seam welding, washing, degreasing, and drying of the grooves, drying of the flux by an extremely high level, diffusion of hydrogen of the inner surface weld metal by the increase of input heat in seam welding from the outer surface, and the like can be mentioned.

The method of decreasing the hydrogen concentration by post heating the weld metal after seam welding from the inner and outer surfaces is an effective means for the prevention of hydrogen embrittlement cracks, but heat treatment of a relatively high temperature and long period of time is necessary. In particular, along with the increasing thickness of steel pipe, a longer time of treatment becomes necessary. When the heating temperature is the same, the time required for heatment becomes longer proportional to the square of the thickness.

When mass producing a high strength welded steel pipe by the UOE process, a shorter heat treatment time, even by 1 minute, is preferable since the time has a direct effect on the productivity. Therefore, the inventors studied the method of preventing transverse cracks by heat treatment of a short period of time. As clear from the residual stress distribution of FIG. 2 and the results of FIGS. 5 and 6, to prevent transverse cracks, it is sufficient to reduce the hydrogen concentration in the inner surface weld metal formed by the preceding seam welding.

First, the inventors seam welded samples from the inner surface, allowed them to stand for one week to cause the hydrogen to diffuse, then seam welded them from the outer surface. As a result, the hydrogen concentration in the inner surface weld metal after the outer surface welding was 0.2 cc/100 g or less and no transverse cracks occurred at all. Next, the inventors seam welded samples from the inner surface, then heated them to 150 to 500° C., cooled them without holding after reaching the heating temperature for dehydrogenation treatment, then seam welded them from the outer surface. In this case, the hydrogen concentration in the inner surface weld metal was 0.2 cc/100 g or less and no transverse cracks occurred at all.

When the heating temperature of the dehydrogenation treatment is 150° C. or less, the time required to decrease the hydrogen concentration to 0.2 cc/100 g or lower becomes longer, while if over 500° C., the base material of the high strength welded steel pipe deteriorates in toughness due to the heat effect. Because of this, the heating temperature of the dehydrogenation treatment is preferably made within the range of 150 to 500° C.

Regarding the heating time of the dehydrogenation treatment, based on experimental results, a time longer than the t of the following formula (I) is preferable. Due to this, the hydrogen concentration of the inner surface weld metal after outer surface welding can be made 0.2 cc/100 g or less.

$$t=(h/16)^2 \times \exp^{((17000/(273+T))-30)} \qquad (1)$$

Here, t is the heating time [s], h is the weld metal height [mm] and T is the heating temperature [° C.].

EXAMPLES

Below, the present invention will be explained in detail by examples. Note that, here, $\phi$ represents the diameter and t represents the thickness.

Table 1 shows examples and comparative examples when making pipes of a steel pipe size of $\phi 711 \times 13$ t, $\phi 762 \times 16$ t, $\phi 914 \times 16$ t, $\phi 1118 \times 19$ t, and $\phi 1219 \times 19$ t and a steel pipe strength of 850 to 1100 MPa or a steel pipe strength of 900 to 1050 MPa by the UOE process or the bending roll (BR) process and seam welding them in the order of the inner surface and outer surface. Note that the tensile strength in Table 1 was measured by obtaining an API full thickness test piece from the base material using the longitudinal direction as the circumferential direction.

The base material of the UOE steel pipe used for the examples had a chemical composition containing, by mass %, C: 0.08%, Si: 0.15%, Mn: 1.85%, P: 0.011%, S: 0.0003%, Ni: 0.38%, Mo: 0.34%, NB: 0.029%, Ti: 0.013%, Al: 0.02%, B: 0.0008%, N: 0.0025%, V: 0.059%, Cu: 0.10%, and Cr: 0.45% and having a balance of Fe and unavoidable impurities.

In addition, the weld metal had a chemical composition containing, by mass %, C: 0.061%, Si: 0.26%, Mn: 1.68%, P: 0.01%, S: 0%, Ni: 2.4%, Cr+Mo+V: 1.9%, Ti: 0.02%, Al: 0.013%, B: 0.0009%, and O: 0.015% and having a balance of Fe and unavoidable impurities.

Note that the welding wire used for said welding had a chemical composition containing, by mass %, C: 0.041%, Si: 0.21%, Mn: 1.73%, Ni: 4.9%, Cr+Mo+V: 4.3%, Ti: 0.005%, and Al: 0.012% or less and having a balance of Fe and unavoidable impurities. As the welding condition, the heat input was 2.8 kJ/mm.

The formation of transverse cracks was detected by ultrasonic flaw detection in accordance with JIS G 0584 after finishing outer surface welding, then allowing the sample to stand for 72 hours until pipe enlargement. The hydrogen concentration was measured by inner surface welding, then outer surface welding, waiting for the elapse of 4 hours after the outer surface welding in the period until the pipe enlargement process, and measuring the hydrogen concentration at the point of time when the weld metal becomes close to ordinary temperature. The test pieces for measuring the hydrogen concentration were obtained by taking a sample of 200 mm×200 mm containing the inner and outer surface weld metal and storing it in dry ice. Test pieces of 5 mm×5 mm×40 mm were taken from the inner surface weld metal of this sample. The diffusible hydrogen was extracted under the conditions of holding at 45° C. for 72 hours, then the gas chromatography method was used for measurement. For the gas chromatography method, the method used in the method of measurement of hydrogen of a steel weld zone defined by JIS Z 3118 was used. Table 1 shows the hydrogen concentration by the average value of three test pieces.

In a steel pipe with a hydrogen concentration of 0.2 cc or less per 100 g, there were almost no hydrogen embrittlement cracks. As opposed to this, with a hydrogen concentration of over 0.2 to 0.4 cc per 100 g, there were cases where cracks occurred and cases where they didn't occur. If over 0.4 cc per 100 g, cracks were observed in all steel pipes. Here, samples with a hydrogen concentration of over 0.2 to 0.4 cc per 100 g include the case of welding the inner and outer surfaces, then post-heating holding the samples at 200° C. for 3 minutes. Samples with a hydrogen concentration of over 0.4 cc per 100 g were not heat treated.

Table 2 shows examples and comparative examples when making pipes of a steel pipe size of φ711×13 t, φ762×16 t, φ914×16 t, φ1118×19 t, and φ1219×19 t and a steel pipe strength of 850 to 1100 MPa by the UOE process or the bending roll (BR) process, seam welding them in the order of the inner surface and outer surface, then applying predetermined heat treatment.

As shown in Examples 17 to 35, when heated by the heating time considered necessary in the present invention or more, the hydrogen concentration becomes 0.2 cc/100 g or less per 100 g and hydrogen embrittlement cracks do not form, but as shown in Comparative Examples 36 to 42, when the time is short, the hydrogen concentration becomes 0.2 cc or more per 100 g and cracks are generated.

TABLE 1

| | Pipe-making process | Outside diameter | Thickness | Tensile strength (MPa) | Hydrogen concentration at inner surface weld metal (cc/100 g) | Presence of cracks |
|---|---|---|---|---|---|---|
| Ex. 1 | UOE | 711 | 13 | 860 | 0.18 | None |
| Ex. 2 | | | | 980 | 0.1 | None |
| Ex. 3 | | 762 | 16 | 950 | 0.06 | None |
| Ex. 4 | | | | 1000 | 0.2 | None |
| Ex. 5 | | 914 | 16 | 1010 | 0.04 | None |
| Ex. 6 | | | | 930 | 0.12 | None |
| Ex. 7 | | | | 850 | 0.13 | None |
| Ex. 8 | | | | 1014 | 0.18 | None |
| Ex. 9 | | | | 980 | 0.18 | None |
| Ex. 10 | | 1118 | 19 | 920 | 0.12 | None |
| Ex. 11 | | | | 1100 | 0.18 | None |
| Ex. 12 | | 1219 | 19 | 850 | 0.13 | None |
| Ex. 13 | | | | 980 | 0.16 | None |
| Ex. 14 | | | | 1080 | 0.2 | None |
| Ex. 15 | BR | 1219 | 19 | 850 | 0.1 | None |
| Ex. 16 | | | | 1080 | 0.18 | None |
| Comp. Ex. 1 | UOE | 762 | 16 | 930 | 0.32 | None |
| Comp. Ex. 2 | | | | 1005 | 0.24 | Yes |
| Comp. Ex. 3 | | | | 1005 | 0.38 | Yes |
| Comp. Ex. 4 | | 914 | 16 | 1012 | 0.31 | Yes |
| Comp. Ex. 5 | | | | 850 | 0.31 | None |
| Comp. Ex. 6 | | | | 950 | 0.32 | None |
| Comp. Ex. 7 | | | | 1005 | 0.33 | None |
| Comp. Ex. 8 | | | | 930 | 0.47 | Yes |
| Comp. Ex. 9 | | | | 880 | 2.09 | Yes |
| Comp. Ex. 10 | | 1219 | 19 | 860 | 0.38 | Yes |
| Comp. Ex. 11 | | | | 960 | 0.85 | Yes |
| Comp. Ex. 12 | | | | 1008 | 0.45 | Yes |
| Comp. Ex. 13 | BR | 1219 | 19 | 900 | 0.3 | Yes |
| Comp. Ex. 14 | | | | 930 | 0.25 | None |

| | | Pipe-making process | Outside diameter (mm) | Thickness (mm) | Tensile strength (MPa) | Location | Hydrogen diffusion heat treatment | | | Hydrogen content at inner surface weld metal (cc/100 g Fe) | Presence of cracks | Predicted necessary time (sec) |
|---|---|---|---|---|---|---|---|---|---|---|---|---|
| | | | | | | | Bead thickness h (mm) | Temperature (° C.) | Time (sec) | | | |
| Ex. | 17 | UOE | 711 | 13 | 880 | Behind outer surface | 16 | 200 | 600 | 0.18 | None | 480 |
| | 18 | | | | 880 | Behind inner surface | 10 | 200 | 300 | 0.11 | None | 180 |
| | 19 | | | | 1010 | Behind outer surface | 16 | 200 | 600 | 0.04 | None | 480 |
| | 20 | | 914 | 16 | 1000 | Behind outer surface | 19 | 200 | 1200 | 0.04 | None | 660 |
| | 21 | | | | 1000 | Behind inner surface | 11 | 200 | 300 | 0.04 | None | 240 |
| | 22 | | | | 980 | Behind outer surface | 18 | 200 | 600 | 0.05 | None | 600 |
| | 23 | | | | 980 | Behind inner surface | 9 | 200 | 300 | 0.01 | None | 120 |
| | 24 | | | | 980 | Behind outer surface | 19 | 250 | 600 | 0 | None | 540 |
| | 25 | | | | 930 | Behind outer surface | 19 | 200 | 1200 | 0 | None | 660 |
| | 26 | | | | 930 | Behind inner surface | 14 | 200 | 600 | 0 | None | 360 |

-continued

|  |  | Pipe-making process | Outside diameter (mm) | Thickness (mm) | Tensile strength (MPa) | Location | Hydrogen diffusion heat treatment | | | Hydrogen content at inner surface weld metal (cc/100 g Fe) | Presence of cracks | Predicted necessary time (sec) |
|  |  |  |  |  |  |  | Bead thickness h (mm) | Temperature (° C.) | Time (sec) |  |  |  |
|---|---|---|---|---|---|---|---|---|---|---|---|---|
|  | 27 |  | 1118 | 19 | 860 | Behind outer surface | 22 | 300 | 600 | 0.06 | None | 600 |
|  | 28 |  |  |  | 860 | Behind inner surface | 15 | 300 | 300 | 0.02 | None | 300 |
|  | 29 |  | 914 | 16 | 1000 | Behind outer surface | 19 | 250 | 1200 | 0.02 | None | 540 |
|  | 30 |  |  |  | 1000 | Behind inner surface | 14 | 250 | 300 | 0.03 | None | 300 |
|  | 31 |  |  |  | 960 | Behind outer surface | 19 | 300 | 600 | 0.1 | None | 420 |
|  | 32 |  |  |  | 960 | Behind outer surface | 19 | 250 | 900 | 0.15 | None | 540 |
|  | 33 |  |  |  | 960 | Behind inner surface | 14 | 250 | 300 | 0.09 | None | 300 |
|  | 34 | BR | 1219 | 19 | 1080 | Behind outer surface | 22 | 200 | 900 | 0.05 | None | 840 |
|  | 35 |  |  |  | 1080 | Behind inner surface | 12 | 200 | 300 | 0.04 | None | 240 |
| Comp. Ex. | 36 | UOE | 762 | 16 | 970 | Behind outer surface | 19 | 150 | 600 | 0.25 | Yes | 840 |
|  | 37 |  |  |  | 1005 | Behind outer surface | 19 | 200 | 300 | 0.26 | Yes | 660 |
|  | 38 |  |  |  | 990 | Behind outer surface | 19 | 150 | 600 | 0.28 | Yes | 840 |
|  | 39 |  | 914 | 16 | 850 | Behind outer surface | 19 | 150 | 600 | 0.31 | Yes | 840 |
|  | 40 |  |  |  | 930 | Behind outer surface | 19 | 200 | 300 | 0.26 | Yes | 660 |
|  | 41 |  | 1219 | 19 | 870 | Behind outer surface | 22 | 250 | 300 | 0.29 | Yes | 720 |
|  | 42 |  |  |  | 870 | Behind inner surface | 15 | 200 | 300 | 0.22 | Yes | 420 |

INDUSTRIAL APPLICABILITY

According to the present invention, it becomes possible to prevent the generation of hydrogen embrittlement cracks at the weld zone of a high strength welded steel pipe having a tensile strength of 850 MPa or more used for a natural gas or crude oil transport line pipe or the like.

The invention claimed is:

1. A method of production of a high strength welded steel pipe superior in hydrogen embrittlement cracking resistance of weld metal comprising shaping a steel sheet of a tensile strength of 850 MPa or more into a tubular form, seam welding an abutting part from the inner surface and then the outer surface of the steel sheet, using a dehydrogenation treatment to reduce the hydrogen concentration of the inner surface weld metal to 0.2 cc or less per 100 g at a temperature of 100° C. or less, then expanding or reducing the size of the pipe for correction, wherein said dehydrogenation treatment comprises heating to a heating temperature T [° C.] in the range of 150 to 500° C. for a heating time t[s] found from the following formula from the weld metal thickness h [mm] and heating temperature T up to a heating time of 1200 seconds $$t = (h/16)^2 / \exp^{(-957/273+T)}.$$

2. A method of production of a high strength welded steel pipe superior in hydrogen embrittlement cracking resistance of weld metal as set forth in claim 1, wherein the hydrogen concentration at the inner surface of the weld metal is 0.13 cc or less per 100 g at a temperature of 100° C. or less.

3. A method of production of a high strength welded steel pipe superior in hydrogen embrittlement cracking resistance of weld metal as set forth in claim 1, wherein said dehydrogenation treatment is a post welding heat treatment after outer surface welding.

4. A method of production of a high strength welded steel pipe superior in hydrogen embrittlement cracking resistance of weld metal as set forth in claim 1, wherein said dehydrogenation treatment is a heat treatment after inner surface welding but before outer surface welding.

5. A method of production of a high strength welded steel pipe superior in hydrogen embrittlement cracking resistance of weld metal as set forth in claim 1, wherein said dehydrogenation treatment is allowing said pipe to stand after inner surface welding but before outer surface welding.

6. A method of production of a high strength welded steel pipe superior in hydrogen embrittlement cracking resistance of weld metal as set forth in claim 3, wherein the heat treatment is carried out at a temperature between 200° C. to 400° C.

* * * * *

UNITED STATES PATENT AND TRADEMARK OFFICE
CERTIFICATE OF CORRECTION

| | | |
|---|---|---|
| PATENT NO. | : 8,653,400 B2 | Page 1 of 1 |
| APPLICATION NO. | : 11/884860 | |
| DATED | : February 18, 2014 | |
| INVENTOR(S) | : Eiji Tsuru et al. | |

It is certified that error appears in the above-identified patent and that said Letters Patent is hereby corrected as shown below:

In the Specification

Column 3, line 52, change "(I)" to -- (1) --; and

Column 10, line 14, change "(I)" to -- (1) --.

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,653,400 B2                                              Page 1 of 1
APPLICATION NO.  : 11/884860
DATED            : February 18, 2014
INVENTOR(S)      : Tsuru et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1501 days.

Signed and Sealed this

Twenty-ninth Day of September, 2015

Michelle K. Lee
*Director of the United States Patent and Trademark Office*